(12) United States Patent
Matas

(10) Patent No.: US 9,547,416 B2
(45) Date of Patent: Jan. 17, 2017

(54) IMAGE PRESENTATION

(71) Applicant: Michael Matas, San Francisco, CA (US)

(72) Inventor: Michael Matas, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 369 days.

(21) Appl. No.: 13/677,266

(22) Filed: Nov. 14, 2012

(65) Prior Publication Data

US 2014/0137046 A1    May 15, 2014

(51) Int. Cl.
*G06F 3/0482* (2013.01)
*G06F 3/0488* (2013.01)
*G06F 3/0481* (2013.01)

(52) U.S. Cl.
CPC ......... *G06F 3/0482* (2013.01); *G06F 3/04817* (2013.01); *G06F 3/04883* (2013.01)

(58) Field of Classification Search
None
See application file for complete search history.

(56) References Cited

U.S. PATENT DOCUMENTS

| 5,422,993 A | 6/1995 | Fleming |
| 5,430,494 A | 7/1995 | Saeger |
| 5,668,966 A | 9/1997 | Ono |
| 5,692,175 A | 11/1997 | Davies |
| 5,941,626 A | 8/1999 | Yamuro |
| 6,141,018 A | 10/2000 | Beri |
| 6,188,432 B1 | 2/2001 | Ejima |
| 6,252,594 B1 | 6/2001 | Xia |
| 7,109,975 B2 | 9/2006 | Fedorak |
| 7,415,662 B2 | 8/2008 | Rothmuller |
| 7,479,949 B2 | 1/2009 | Jobs |
| 7,555,725 B2 | 6/2009 | Abramson |
| 7,590,947 B1 | 9/2009 | Gay |
| 7,930,646 B2 | 4/2011 | De Souza |
| 7,945,852 B1 | 5/2011 | Pilskalns |
| 8,051,089 B2 | 11/2011 | Gargi |
| 8,131,118 B1 | 3/2012 | Jing |
| 8,176,438 B2 | 5/2012 | Zaman |
| 8,271,907 B2 | 9/2012 | Kim |
| 8,275,394 B2 | 9/2012 | Mattila |
| 8,287,383 B1 | 10/2012 | Etter |

(Continued)

FOREIGN PATENT DOCUMENTS

| CA | 2781607 | 11/2010 |
| EP | 2 487 603 | 8/2012 |

(Continued)

OTHER PUBLICATIONS

International Search Report and Written Opinion for International Application No. PCT/US2013/068294, Feb. 26, 2014.

(Continued)

*Primary Examiner* — Maryam Ipakchi
(74) *Attorney, Agent, or Firm* — Baker Botts L.L.P.

(57) ABSTRACT

In one embodiment, a method includes displaying a plurality of images stacked into a pile; visually indicating that there are multiple images stacked in the pile; and in response to a first user input in connection with the pile, expanding the pile to display the images in a series. In one embodiment, the method further includes in response to a second user input in connection with the series, collapsing the series to display the image in the pile.

15 Claims, 14 Drawing Sheets

(56) References Cited

U.S. PATENT DOCUMENTS

| | | | |
|---|---|---|---|
| 8,327,284 B2 | 12/2012 | Marusich | |
| 8,327,289 B2 | 12/2012 | Butlin | |
| 8,386,935 B2 | 2/2013 | van Zwol | |
| 8,429,565 B2* | 4/2013 | Agarawala et al. | 715/863 |
| 8,442,265 B1 | 5/2013 | Bosworth | |
| 8,456,488 B2* | 6/2013 | Ubillos et al. | 345/619 |
| 8,464,176 B2* | 6/2013 | Van Dok et al. | 715/793 |
| 8,504,586 B2 | 8/2013 | Armstrong | |
| 8,540,570 B2 | 9/2013 | Janis | |
| 8,584,015 B2 | 11/2013 | Osten | |
| 8,584,027 B2 | 11/2013 | Quennesson | |
| 8,621,450 B2 | 12/2013 | Firman | |
| 8,667,418 B2* | 3/2014 | Chaudhri et al. | 715/835 |
| 8,677,283 B2 | 3/2014 | Fong | |
| 8,683,377 B2 | 3/2014 | Zuverink | |
| 8,683,378 B2 | 3/2014 | Bull | |
| 8,726,142 B2 | 5/2014 | Piantino | |
| 8,745,511 B2 | 6/2014 | Ducharme | |
| 8,749,610 B1 | 6/2014 | Gossweiler | |
| 8,799,818 B2 | 8/2014 | Kim | |
| 8,803,908 B2 | 8/2014 | Van Osten | |
| 8,811,771 B2 | 8/2014 | Shechtman | |
| 8,830,270 B2 | 9/2014 | Zaman | |
| 8,832,188 B1 | 9/2014 | Cierniak | |
| 8,843,519 B2 | 9/2014 | Armstrong | |
| 8,845,423 B1 | 9/2014 | Monahan | |
| 8,892,997 B2* | 11/2014 | Louch et al. | 715/273 |
| 8,898,562 B2* | 11/2014 | Tocchini et al. | 715/247 |
| 8,922,575 B2* | 12/2014 | Garside et al. | 345/557 |
| 8,938,690 B1 | 1/2015 | Khouri | |
| 9,047,644 B1 | 6/2015 | Terleski | |
| 9,081,410 B2 | 7/2015 | Matas | |
| 2002/0145620 A1 | 10/2002 | Smith | |
| 2003/0233650 A1 | 12/2003 | Zaner | |
| 2004/0095400 A1 | 5/2004 | Anderson | |
| 2004/0145593 A1 | 7/2004 | Berkner | |
| 2004/0164969 A1 | 8/2004 | Matsuda | |
| 2004/0218910 A1 | 11/2004 | Chang | |
| 2004/0252120 A1 | 12/2004 | Hunleth | |
| 2005/0091596 A1 | 4/2005 | Anthony | |
| 2005/0210410 A1* | 9/2005 | Ohwa et al. | 715/821 |
| 2005/0275636 A1 | 12/2005 | Dehlin | |
| 2006/0010382 A1 | 1/2006 | Ejiri | |
| 2006/0080621 A1 | 4/2006 | Park | |
| 2006/0095331 A1 | 5/2006 | O'Malley | |
| 2006/0161868 A1* | 7/2006 | Van Dok | G06F 3/0481 715/835 |
| 2007/0038846 A1 | 2/2007 | Kadambi | |
| 2007/0061488 A1 | 3/2007 | Alagappan | |
| 2007/0150913 A1 | 6/2007 | Ando | |
| 2007/0236475 A1 | 10/2007 | Wherry | |
| 2007/0236477 A1 | 10/2007 | Ryu | |
| 2008/0009325 A1 | 1/2008 | Zinn | |
| 2008/0034381 A1 | 2/2008 | Jalon | |
| 2008/0057926 A1 | 3/2008 | Forstall | |
| 2008/0064438 A1 | 3/2008 | Calvet | |
| 2008/0098316 A1 | 4/2008 | Declan | |
| 2008/0133526 A1 | 6/2008 | Haitani | |
| 2008/0165153 A1 | 7/2008 | Platzer | |
| 2008/0168349 A1 | 7/2008 | Lamiraux | |
| 2008/0168384 A1 | 7/2008 | Platzer | |
| 2008/0168402 A1 | 7/2008 | Blumenberg | |
| 2008/0270886 A1 | 10/2008 | Gossweiler | |
| 2008/0276269 A1 | 11/2008 | Miller | |
| 2008/0282202 A1 | 11/2008 | Sunday | |
| 2008/0294663 A1 | 11/2008 | Heinley | |
| 2008/0307360 A1* | 12/2008 | Chaudhri | G06F 3/0481 715/835 |
| 2009/0007017 A1 | 1/2009 | Anzures | |
| 2009/0031232 A1 | 1/2009 | Brezina | |
| 2009/0044133 A1 | 2/2009 | Goto | |
| 2009/0063995 A1 | 3/2009 | Baron | |
| 2009/0064031 A1 | 3/2009 | Bull | |
| 2009/0064055 A1 | 3/2009 | Chaudhri | |
| 2009/0106687 A1 | 4/2009 | De Souza | |
| 2009/0132921 A1 | 5/2009 | Hwangbo | |
| 2009/0132933 A1 | 5/2009 | Faski | |
| 2009/0144392 A1 | 6/2009 | Wang | |
| 2009/0164602 A1 | 6/2009 | Kies | |
| 2009/0196510 A1 | 8/2009 | Gokturk | |
| 2009/0198359 A1 | 8/2009 | Chaudhri | |
| 2009/0199082 A1 | 8/2009 | Hollander | |
| 2009/0228807 A1 | 9/2009 | Lemay | |
| 2009/0231271 A1 | 9/2009 | Heubel | |
| 2009/0281988 A1 | 11/2009 | Yoo | |
| 2009/0305732 A1 | 12/2009 | Marcellino | |
| 2009/0307623 A1* | 12/2009 | Agarawala et al. | 715/765 |
| 2009/0312033 A1 | 12/2009 | Shen | |
| 2009/0325607 A1 | 12/2009 | Conway | |
| 2010/0049534 A1 | 2/2010 | Whitnah | |
| 2010/0058226 A1 | 3/2010 | Flake | |
| 2010/0058240 A1 | 3/2010 | Bull | |
| 2010/0070628 A1 | 3/2010 | Harrang | |
| 2010/0158315 A1 | 6/2010 | Martin | |
| 2010/0162140 A1 | 6/2010 | Fereira | |
| 2010/0162174 A1 | 6/2010 | Karidi | |
| 2010/0179874 A1 | 7/2010 | Higgins | |
| 2010/0199180 A1 | 8/2010 | Brichter | |
| 2010/0211872 A1 | 8/2010 | Rolston | |
| 2010/0214321 A1 | 8/2010 | Hokkanen | |
| 2010/0274815 A1 | 10/2010 | Vanasco | |
| 2010/0275152 A1 | 10/2010 | Atkins | |
| 2010/0281409 A1 | 11/2010 | Rainisto | |
| 2010/0313165 A1 | 12/2010 | Louch | |
| 2010/0332958 A1 | 12/2010 | Weinberger | |
| 2011/0010641 A1 | 1/2011 | Wolff | |
| 2011/0083082 A1 | 4/2011 | Gottwald | |
| 2011/0084962 A1 | 4/2011 | Kim | |
| 2011/0093812 A1 | 4/2011 | Fong | |
| 2011/0125846 A1 | 5/2011 | Hamana | |
| 2011/0126156 A1 | 5/2011 | Krishnaraj | |
| 2011/0145753 A1 | 6/2011 | Prakash | |
| 2011/0157188 A1 | 6/2011 | Nakagawa | |
| 2011/0164058 A1 | 7/2011 | Lemay | |
| 2011/0182485 A1 | 7/2011 | Shochat | |
| 2011/0184772 A1 | 7/2011 | Norton | |
| 2011/0184960 A1 | 7/2011 | Delphia | |
| 2011/0191685 A1 | 8/2011 | Bamford | |
| 2011/0196923 A1 | 8/2011 | Marcucci | |
| 2011/0202866 A1 | 8/2011 | Huang | |
| 2011/0231745 A1 | 9/2011 | Levesque | |
| 2011/0231802 A1 | 9/2011 | Lee | |
| 2011/0238690 A1 | 9/2011 | Arrasvuori | |
| 2011/0258575 A1 | 10/2011 | Cupp | |
| 2011/0276396 A1 | 11/2011 | Rathod | |
| 2011/0307631 A1 | 12/2011 | Park | |
| 2012/0010995 A1 | 1/2012 | Skirpa | |
| 2012/0011430 A1 | 1/2012 | Parker | |
| 2012/0016858 A1 | 1/2012 | Rathod | |
| 2012/0023407 A1 | 1/2012 | Taylor | |
| 2012/0023425 A1 | 1/2012 | Hackborn | |
| 2012/0030568 A1 | 2/2012 | Migos | |
| 2012/0030616 A1 | 2/2012 | Howes | |
| 2012/0030636 A1 | 2/2012 | Miyazaki | |
| 2012/0054674 A1* | 3/2012 | Beykpour | G06F 3/0481 715/788 |
| 2012/0054684 A1 | 3/2012 | Gossweiler | |
| 2012/0066304 A1 | 3/2012 | Marmon | |
| 2012/0072957 A1 | 3/2012 | Cherukuwada | |
| 2012/0096393 A1 | 4/2012 | Shim | |
| 2012/0105489 A1 | 5/2012 | Monroe | |
| 2012/0110474 A1 | 5/2012 | Chen | |
| 2012/0113095 A1 | 5/2012 | Hwang | |
| 2012/0131508 A1 | 5/2012 | Lee | |
| 2012/0143701 A1 | 6/2012 | Reis | |
| 2012/0147055 A1 | 6/2012 | Pallakoff | |
| 2012/0154444 A1* | 6/2012 | Fernandez | G06T 11/60 345/655 |
| 2012/0159635 A1 | 6/2012 | He | |
| 2012/0167010 A1 | 6/2012 | Campbell | |
| 2012/0169774 A1 | 7/2012 | Yu | |
| 2012/0173994 A1 | 7/2012 | Ho | |
| 2012/0179969 A1 | 7/2012 | Lee | |
| 2012/0212668 A1 | 8/2012 | Schultz | |

(56) References Cited

U.S. PATENT DOCUMENTS

| | | | |
|---|---|---|---|
| 2012/0223951 A1 | 9/2012 | Dunn | |
| 2012/0240071 A1 | 9/2012 | Park | |
| 2012/0249571 A1 | 10/2012 | Houjou | |
| 2012/0278755 A1 | 11/2012 | Lehmann | |
| 2012/0314912 A1 | 12/2012 | Nakagomi | |
| 2012/0331053 A1 | 12/2012 | Dunn | |
| 2013/0060744 A1 | 3/2013 | Roychoudhuri | |
| 2013/0073970 A1 | 3/2013 | Piantino | |
| 2013/0080881 A1 | 3/2013 | Goodspeed | |
| 2013/0095857 A1 | 4/2013 | Garcia | |
| 2013/0097566 A1 | 4/2013 | Berglund | |
| 2013/0111391 A1 | 5/2013 | Penner | |
| 2013/0139111 A1 | 5/2013 | Grimes | |
| 2013/0141456 A1 | 6/2013 | Sokolov | |
| 2013/0179504 A1 | 7/2013 | Adams | |
| 2013/0187944 A1 | 7/2013 | Hamana | |
| 2013/0191711 A1 | 7/2013 | Tashman | |
| 2013/0271471 A1 | 10/2013 | Schorsch | |
| 2013/0321444 A1 | 12/2013 | Efrati | |
| 2013/0326398 A1 | 12/2013 | Zuverink | |
| 2013/0332068 A1 | 12/2013 | Kesar | |
| 2014/0040774 A1 | 2/2014 | Charytoniuk | |
| 2014/0074471 A1 | 3/2014 | Sankar | |
| 2014/0074652 A1 | 3/2014 | Wu | |
| 2014/0089816 A1 | 3/2014 | DiPersia | |
| 2014/0115446 A1 | 4/2014 | Hall | |
| 2014/0123021 A1 | 5/2014 | Walkin | |
| 2014/0123081 A1 | 5/2014 | Park | |
| 2014/0132638 A1 | 5/2014 | Matas | |
| 2014/0136946 A1 | 5/2014 | Matas | |
| 2014/0136959 A1 | 5/2014 | Matas | |
| 2014/0136968 A1 | 5/2014 | Matas | |
| 2014/0136995 A1 | 5/2014 | Matas | |
| 2014/0137010 A1 | 5/2014 | Matas | |
| 2014/0137011 A1 | 5/2014 | Matas | |
| 2014/0137012 A1 | 5/2014 | Matas | |
| 2014/0137013 A1 | 5/2014 | Matas | |
| 2014/0137026 A1 | 5/2014 | Matas | |
| 2014/0137030 A1 | 5/2014 | Matas | |
| 2014/0137043 A1 | 5/2014 | Matas | |
| 2014/0344471 A1 | 11/2014 | Valk | |
| 2014/0344716 A1 | 11/2014 | Martin | |
| 2015/0040035 A1 | 2/2015 | Neelakant | |
| 2015/0277691 A1 | 10/2015 | Matas | |

FOREIGN PATENT DOCUMENTS

| | | |
|---|---|---|
| EP | 2 518 646 | 10/2012 |
| KR | 10-2001-0013878 | 2/2001 |
| KR | 10-2004-0073180 | 8/2004 |
| KR | 10-2012-0048522 | 5/2012 |
| WO | 2010/040201 | 4/2010 |
| WO | 2012/001637 | 1/2012 |
| WO | 2012/125426 | 9/2012 |
| WO | 2012/129336 | 9/2012 |

OTHER PUBLICATIONS

Non-Final Office Action for U.S. Appl. No. 13/676,658, Feb. 25, 2015.
Non-Final Office Action for U.S. Appl. No. 13/676,831, Mar. 4, 2015.
Final Office Action for U.S. Appl. No. 13/663,229, Jan. 26, 2015.
Response to Non-Final Office Action for U.S. Appl. No. 13/663,229, Oct. 3, 2014.
Non-Final Office Action for U.S. Appl. No. 13/663,229, Jun. 3, 2014.
Response to Final Office Action for U.S. Appl. No. 13/663,229, Mar. 25, 2014.
Supplemental Response for U.S. Appl. No. 13/663,229, Mar. 20, 2014.
Final Office Action for U.S. Appl. No. 13/663,229, Sep. 25, 2013.
Response to Non-Final Office Action for U.S. Appl. No. 13/663,229, Aug. 12, 2013.
Non-Final Office Action for U.S. Appl. No. 13/663,229, Mar. 12, 2013.
Response to Non-Final Office Action for U.S. Appl. No. 13/677,002, Dec. 29, 2014.
Non-Final Office Action for U.S. Appl. No. 13/677,002, Jan. 6, 2014.
Response to Final Office Action for U.S. Appl. No. 13/677,002, Oct. 3, 2014.
Final Office Action for U.S. Appl. No. 13/677,002, May 22, 2014.
Response to Non-Final Office Action for U.S. Appl. No. 13/677,002, Feb. 6, 2014.
Non-Final Office Action for U.S. Appl. No. 13/677,002, Nov. 6, 2013.
Response to Non-Final Office Action for U.S. Appl. No. 13/677,056, Mar. 20, 2015.
Non-Final Office Action for U.S. Appl. No. 13/677,056, Dec. 12, 2014.
Notice of Allowance for U.S. Appl. No. 13/676,951, Mar. 5, 2015.
Response to Final Office Action for U.S. Appl. No. 13/676,951, Feb. 12, 2015.
Final Office Action for U.S. Appl. No. 13/676,951, Feb. 23, 2014.
Response to Non-Final Office Action for U.S. Appl. No. 13/676,951, Nov. 6, 2014.
Non-Final Office Action for U.S. Appl. No. 13/676,951, Aug. 5, 2014.
Response to Final Office Action for U.S. Appl. No. 13/676,951, Apr. 4, 2014.
Final Office Action for U.S. Appl. No. 13/676,951, Dec. 4, 2013.
Response to Non-Final Office Action for U.S. Appl. No. 13/676,951, Sep. 18, 2013.
Non-Final Office Action for U.S. Appl. No. 13/676,951, Apr. 18, 2013.
Response to Non-Final Office Action for U.S. Appl. No. 13/677,104, Feb. 12, 2015.
Non-Final Office Action for U.S. Appl. No. 13/677,104, Dec. 10, 2014.
Non-Final Office Action for U.S. Appl. No. 13/677,269, Mar. 13, 2015.
Non-Final Office Action for U.S. Appl. No. 13/677,247, Mar. 3, 2015.
Response to Non-Final Office Action for U.S. Appl. No. 13/677,274, Dec. 22, 2014.
Non-Final Office Action for U.S. Appl. No. 13/677,274, Dec. 22, 2014.
International Search Report and Written Opinion for International Applications No. PCT/US2013/067226, Feb. 10, 2014.
International Search Report and Written Opinion for International Applications No. PCT/US2013/067482, Feb. 19, 2014.
International Search Report and Written Opinion for International Applications No. PCT/US2013/067650, Feb. 19, 2014.
International Search Report and Written Opinion for International Applications No. PCT/US2013/067925, Feb. 19, 2014.
International Search Report and Written Opinion for International Applications No. PCT/US2013/068303, Feb. 13, 2015.
International Search Report and Written Opinion for International Applications No. PCT/US2013/068308, Feb. 13, 2014.
International Search Report for International Applications No. PCT/US2013/066289, Feb. 3, 2014.
"Ken Burns Effect," Wikipedia, http://en.wikipedia.org/w/index.php?title=Ken_Burns_effect&printable=yes (downloaded Sep. 18, 2012), Nov. 14, 2012.
White, Panning and Zooming in Premiere Pro CS5, Dec. 10, 2010, http://www.youtube.com/watch?v=_Okt6OVAyb8, Mar. 4, 2015.
Notice of Allowance for U.S. Appl. No. 13/676,658, Oct. 13, 2015.
Notice of Allowance for U.S. Appl. No. 13/676,658, Sep. 28, 2015.
Notice of Allowance for U.S. Appl. No. 13/676,658, Sep. 10, 2015.
Response to Non-Final Office Action for U.S. Appl. No. 13/676,658, May 26, 2015.
Notice of Allowance for U.S. Appl. No. 13/676,831, Jul. 22, 2015.
Response to Non-Final Office Action for U.S. Appl. No. 13/676,832, May 18, 2015.

(56) References Cited

OTHER PUBLICATIONS

Notice of Allowance for U.S. Appl. No. 13/663,229, Oct. 9, 2015.
Response to Final Office Action for U.S. Appl. No. 13/663,229, Apr. 21, 2015.
Non-Final Office Action for U.S. Appl. No. 13/677,002, Sep. 24, 2015.
Response to Final Office Action for U.S. Appl. No. 13/677,002, Sep. 3, 2015.
Final Office Action for U.S. Appl. No. 13/677,002, Apr. 30, 2015.
Final Office Action for U.S. Appl. No. 13/677,056, Jun. 10, 2015.
Notice of Allowance for U.S. Appl. No. 13/676,951, May 28, 2015.
Notice of Allowance for U.S. Appl. No. 13/676,951, Apr. 23, 2015.
Final Office Action for U.S. Appl. No. 13/677,222, Sep. 17, 2015.
Response to Non-Final Office Action for U.S. Appl. No. 13/677,222, Jun. 24, 2015.
Non-Final Office Action for U.S. Appl. No. 13/677,222, Mar. 27, 2015.
Final Office Action for U.S. Appl. No. 13/677,166, Sep. 17, 2015.
Response to Non-Final Office Action for U.S. Appl. No. 13/677,166, Jun. 24, 2015.
Non-Final Office Action for U.S. Appl. No. 13/677,166, Mar. 27, 2015.
Non-Final Office Action for U.S. Appl. No. 13/677,104, Sep. 24, 2015.
Response to Final Office Action for U.S. Appl. No. 13/677,104, Jul. 27, 2015.
Final Office Action for U.S. Appl. No. 13/677,104, Mar. 27, 2015.
Final Office Action for U.S. Appl. No. 13/677,269, Sep. 10, 2015.
Response to Non-Final Office Action for U.S. Appl. No. 13/677,269, Jun. 9, 2015.
Final Office Action for U.S. Appl. No. 13/677,247, Jun. 5, 2015.
Response to Non-Final Office Action for U.S. Appl. No. 13/677,247, May 18, 2015.
Response to Final Office Action for U.S. Appl. No. 13/677,274, Oct. 1, 2015.
Final Office Action for U.S. Appl. No. 13/677,274, Apr. 7, 2015.
Notice of Allowance for U.S. Appl. No. 13/677,256, Sep. 21, 2015.
Supplemental Response for U.S. Appl. No. 13/677,256, Sep. 8, 2015.
Response to Non-Final Office Action for U.S. Appl. No. 13/677,256, Jul. 8, 2015.
Non-Final Office Action for U.S. Appl. No. 13/677,256, Mar. 30, 2015.
Canadian Office Action for CA 2,890,276, Oct. 13, 2016.

\* cited by examiner

IMAGE PRESENTATION

TECHNICAL FIELD

This disclosure generally relates to a user interface.

BACKGROUND

A user interface (UI), in the industrial design field of human-machine interaction, is the space where interactions between humans and machines occur. The goal of the interactions between a human, often referred to as a "user", and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

SUMMARY OF PARTICULAR EMBODIMENTS

In particular embodiments, a user interface for presenting content to users may have a hierarchical structure. The user interface may have any number of content sections, and each content section may have any number of content items. The content items may be of any type or format. A user may consume or interact with some of the content items. In particular embodiments, each content item may correspond to a user-interface element.

In particular embodiments, a set of images may be displayed where the images are stacked in a pile. There is visual indication that multiple images are stacked together. In response to a user input in connection with the pile, the pile may be expanded so that the individual images are displayed in a series. In response to a user input in connection with the series, the series may be collapsed so that the images are stacked back into the pile. While the individual images are displayed in a series, a user may scroll through the series to view each image.

In particular embodiments, the set of images may be photos belonging to a photo album. When the photos are displayed in a series, user comments concerning the photo album may be displayed with the photos (e.g., also in a series). The user may scroll through the user comments to view each comment.

DESCRIPTION OF EXAMPLE EMBODIMENTS

A user interface (UI) may be incorporated into any type of software applications, including, for example, desktop applications, mobile applications, or web-based applications, to enable users to interact with and control the applications. A graphical user interface (GUI) is a type of user interface that enables users to interact with software applications through multimedia objects, including, for example, icons, buttons, menus, images, video, or audios.

Figure 1:
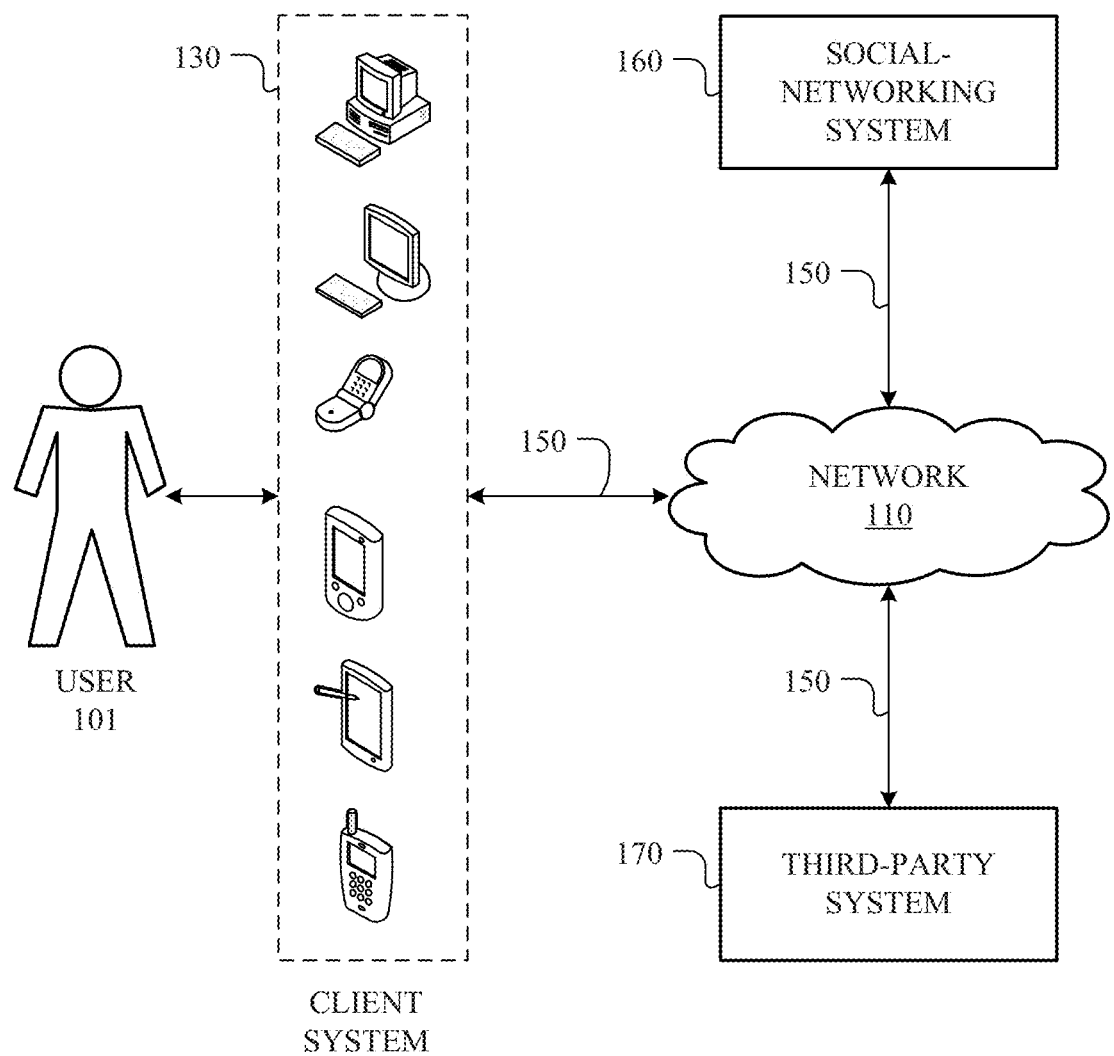
FIG. 1 illustrates an example network environment associated with a social-networking system.

In particular embodiments, a software application may be associated with a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various third-party software applications (e.g., web-based applications). Third-party system 170 may generate, store, receive, and transmit various types of data, such as, for example, texts, images, videos, or audios. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, data (e.g., data representing various types of information or content) may be sent between servers associated with social-networking system 160 and individual client systems 130 via network 110. When two electronic devices (e.g., a server and a client) are connected to a network (e.g., a computer or communications network, such as network 110), data may be transmitted between the two devices over the network using one or more suitable network protocols. A network may include any number of sub-networks. By transmitting data between the two devices, the two devices may communicate with each other.

In network communications, there are two ways to send a communication (i.e., data) from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction. In particular embodiments, a server associated with social-networking system 160 may push data to a client system 130. A communication pushed from a server to a client may be referred to as a "push notification". Similarly, a client system 130 may push data to a server associated with social-networking system 160.

In particular embodiments, a client system 130 may be a mobile electronic or computing device. A mobile electronic device—such as a Smartphone, tablet computer, or laptop computer—may include functionality for determining its location, direction, or orientation, such as a GPS receiver, compass, or gyroscope. Such a mobile device may also include functionality for wireless communication, such as BLUETOOTH communication, near-field communication (NFC), or infrared (IR) communication or communication with a wireless local area networks (WLANs) or cellular-telephone network. Such a mobile device may also include one or more cameras, scanners, touchscreens, microphones, or speakers. Mobile electronic devices may also execute software applications, such as games, web browsers, or social-networking applications. With social-networking applications, users may connect, communicate, and share information with other users in their social networks.

Figure 2A:
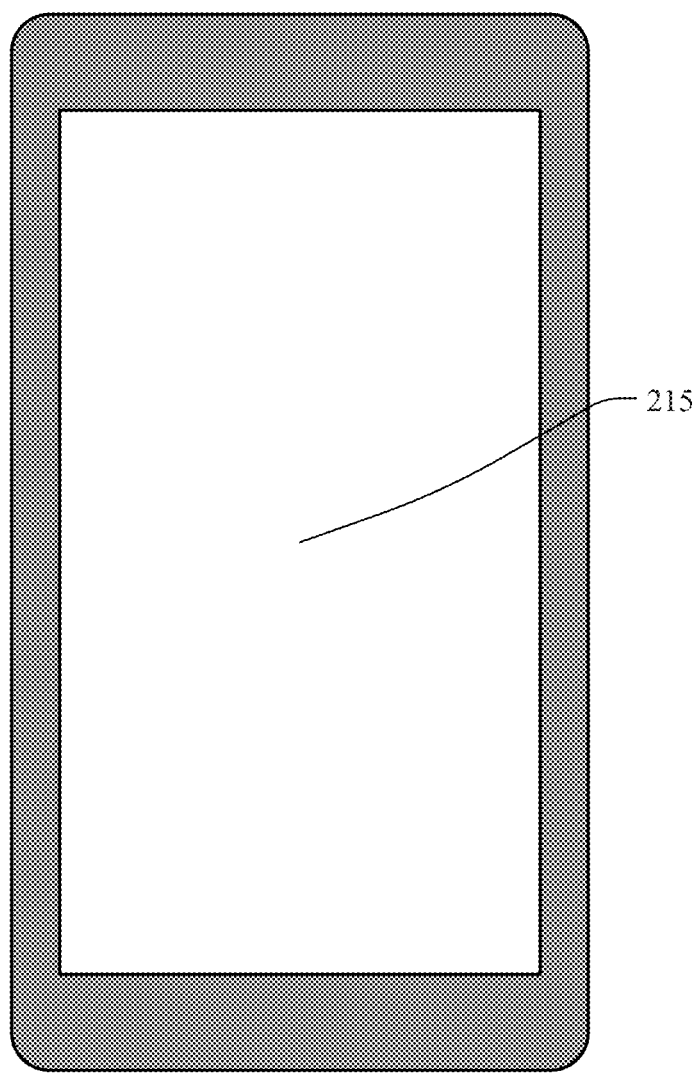
FIGS. 2A and 2B illustrate two example mobile electronic devices.

In particular embodiments, a mobile electronic device (e.g., Smartphone or tablet computer) may include a touchscreen capable of receiving touch input. FIG. 2A illustrates an example mobile electronic device 210 (e.g., a Smartphone) having a touchscreen 215. Touchscreen 215 may incorporate one or more touch sensors and a touch-sensor controller for detecting the presence and location of a touch (e.g., from a user's finger) or the proximity of an object (e.g., a stylus). In particular embodiments, a specific touch detected via touchscreen 215 may result in a touch input event.

Figure 2B:
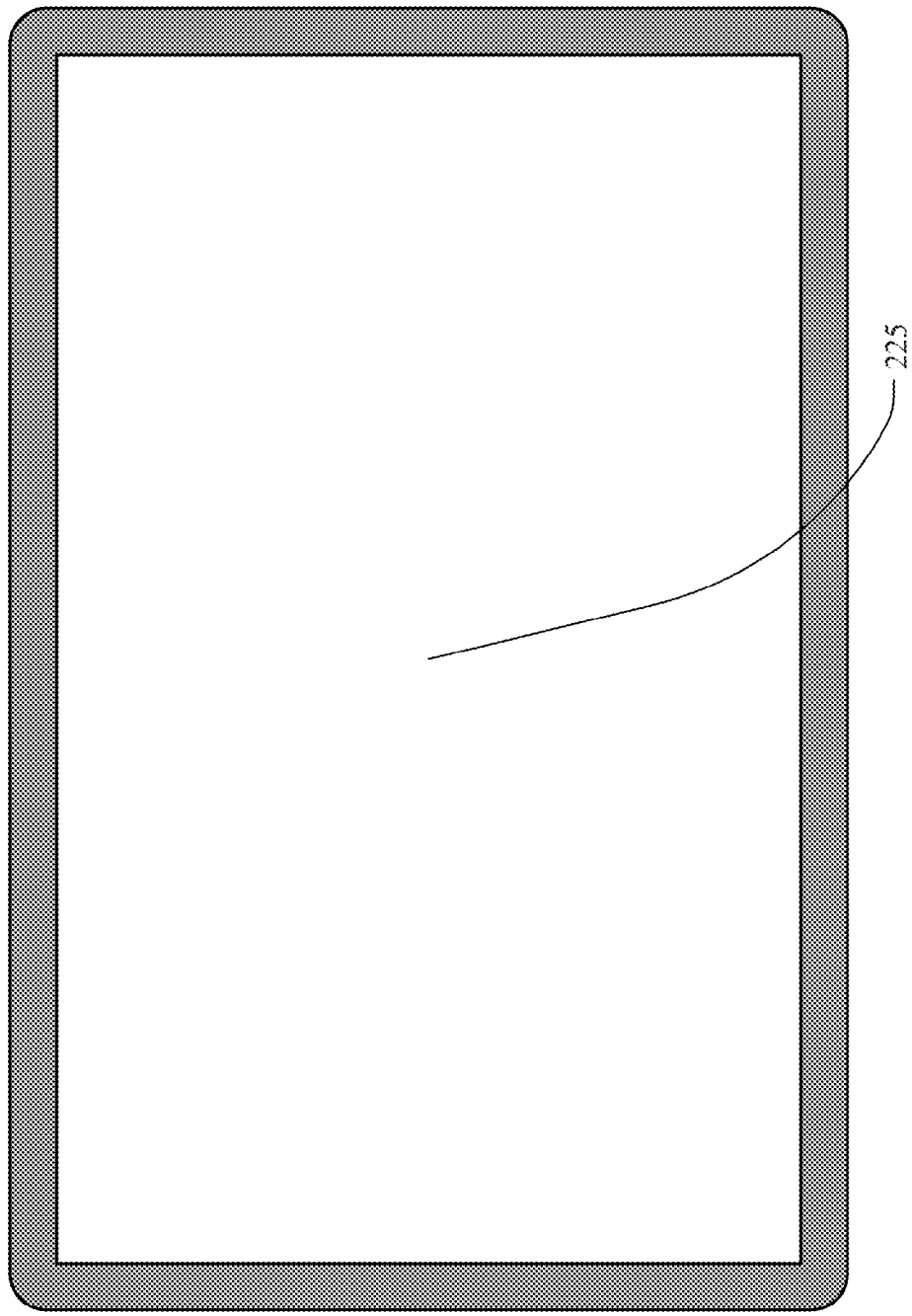

Different mobile electronic devices may have different designs. As a result, the size, shape, or aspect ration of the touchscreens of different mobile devices may differ. FIG. 2B illustrates another example mobile electronic device 220 (e.g., a tablet computer) having a touchscreen 225. Similarly, touchscreen 225 may incorporate one or more touch sensors and a touch-sensor controller for detecting the presence and location of a touch (e.g., from a user's finger) or the proximity of an object (e.g., a stylus). A specific touch detected via touchscreen 225 may result in a touch input event. However, since mobile electronic devices 210 and 220 are two different types of devices, their respective touchscreen 215 and 225 have different sizes and aspect ratios.

There may be various types of touches or gestures, such as single tap, double tap, short press, long press, slide, swipe, flip, pinch open, or pinch close, corresponding to various types of touch input events. Different touch input events may result in different responses and this disclosure contemplates any applicable gesture.

Social-networking system 160 may store various types of data including, for example, user data, application data, or social data. In particular embodiments, such data may be stored in a graph having any number of nodes and edges, where each edge connects two nodes. The graph is often referred to as a "social graph" or "open graph" as it contains, among others, social information.

Figure 3:
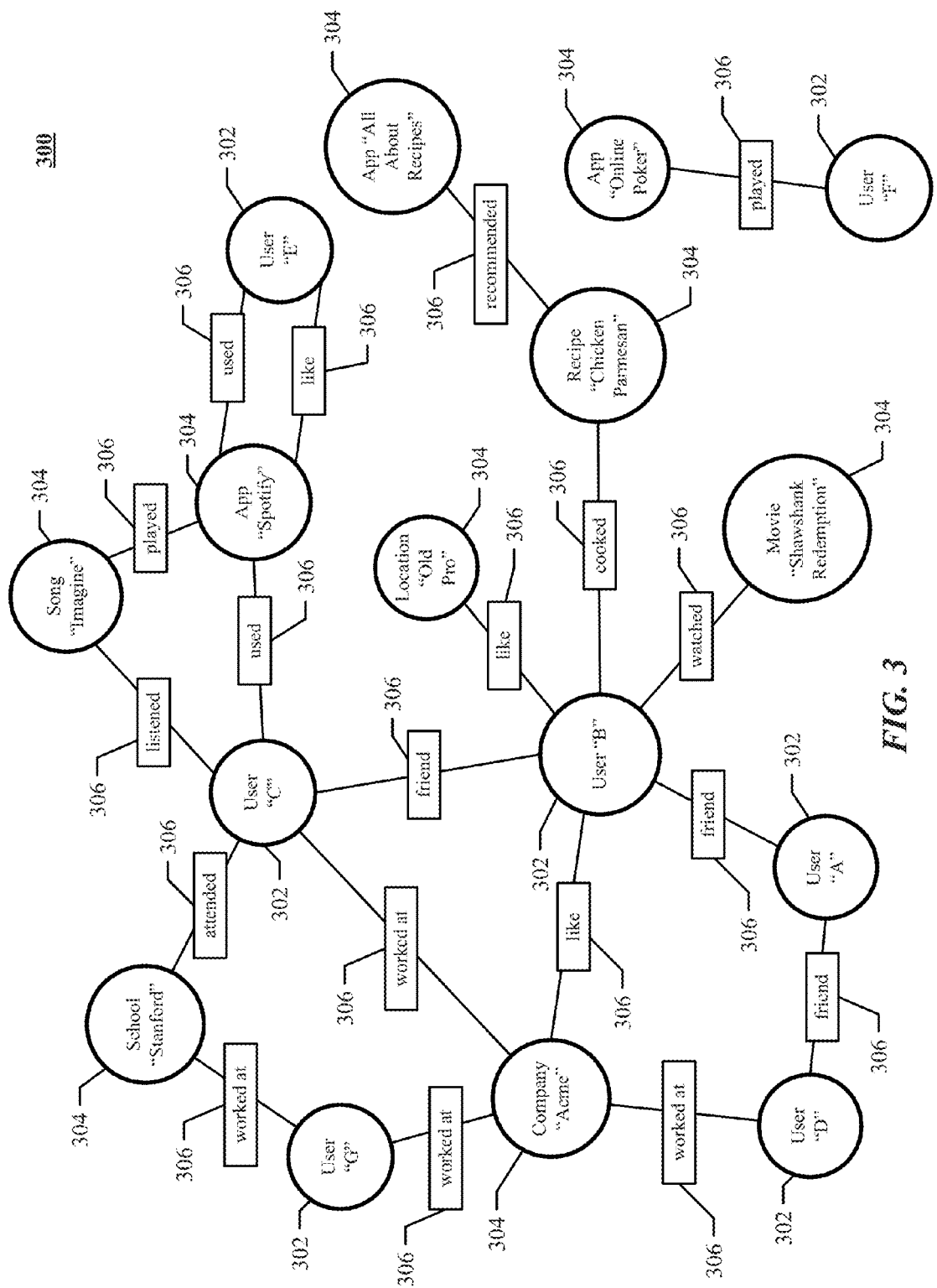
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more of data stores (e.g., data stores associated with social-networking system 160). In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, a set of objects may be organized into a hierarchy based on, for example, how the individual objects are related to each other. An object hierarchy may have any number of levels, and at each level, there may be any number of objects. Parent-child or sibling relationships may exist between specific objects in the hierarchy. Within an object hierarchy, a parent object is one level above the level of its child objects. Two sibling objects are at the same level and share the same parent object. In addition, any portion of the hierarchy may also be considered a hierarchy in itself.

Figure 4:
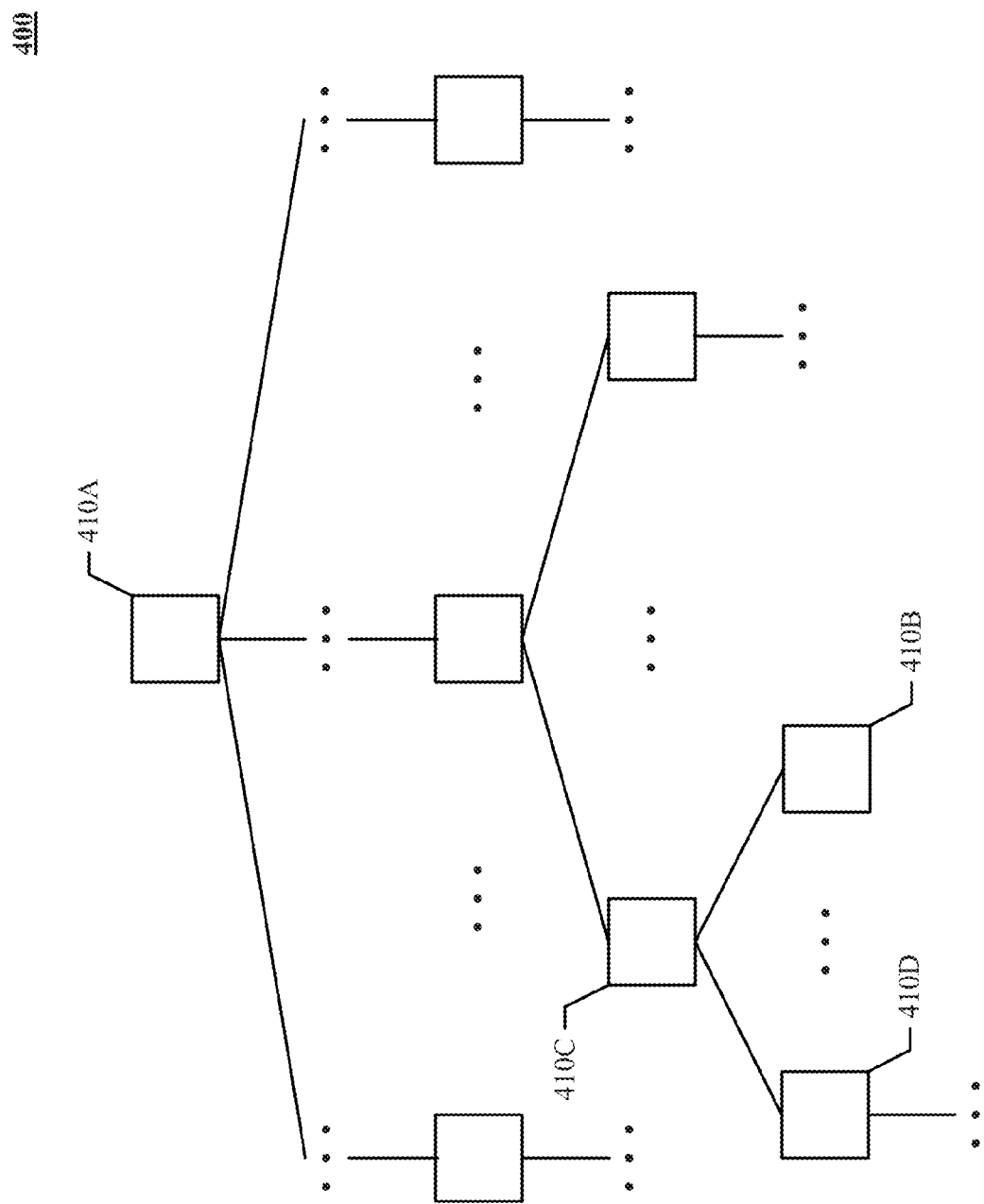
FIG. 4 illustrates an example object hierarchy.

FIG. 4 illustrates a portion of an example object hierarchy 400 that includes a number of objects 410. FIG. 4 is in fact a visual representation of an object hierarchy. Each node represents a specific object in the hierarchy, and each edge connecting two nodes represents a parent-child relationship between the two corresponding objects.

In particular embodiments, an object in a hierarchy may or may not have a parent. If an object does not have a parent, it may be referred to as a "root" object (e.g., object 410A). Typically, the root object is positioned at the first or topmost level of the hierarchy. In particular embodiments, an object in a hierarchy may or may not have any children. If an object does not have any children, it may be referred to as a "leaf" or "terminal" object (e.g., object 410B). If an object does have children (e.g., object 410C), it may have any number of children. In addition, objects sharing the same parent may be referred to as each other's "siblings". For example, in FIG. 4, object 410C is the parent of objects 410D and 410B. Objects 410D and 410B are the children of object 410C and are siblings to each other. Thus, a hierarchy of objects (e.g., object hierarchy 400) not only includes the individual objects (e.g., objects 410) themselves but also indicates the relationships among the specific objects. Moreover, the position of a specific object within the hierarchy may indicate its relationships with other objects in the hierarchy.

Objects 410 may be of various types, and this disclosure contemplates any applicable object types. For example and without limitation, the term "object" may refer to any type of content, including but not limited to images, videos, captions, text blocks or boxes, user-interface elements, clickable links, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or other content or media elements on each page. Each of these also corresponds to an object (e.g., user-interface component) in the hierarchy. More specifically, within the hierarchy, the digital book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or other content or media elements on that page. A text block, image, video, audio, or other content or media element is one of the child objects of the page to which it belongs. Similarly, for a software application that manages news feeds, its components may include the individual news channels and the news stories within each channel. Each of these may correspond to an object. Within the hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website implemented by social-networking system 160, may also be arranged in a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, applications the user has added to the profile page, stories, songs the user has listened to, playlists. These various types of objects may all be children of the profile page, or may be further arranged into multiple levels. With some implementations, a user's profile page may include any number of sections, such as the user's education and employment information, the user's public "wall", or the user's social connections. Then the various types of objects above may be divided into specific sections.

In particular embodiments, an object 410 may be a component of a user interface. In this case, object hierarchy 400 may correspond to the user interface, and each object 410 may correspond to a specific component of the user-interface. A user interface may have various types of components, and this disclosure contemplates any applicable user-interface component types. For example, a user-interface component (i.e., an object 410) may be a window, a section, a tab, an image, a video, an audio, a text block, a menu, an icon, a button, a checkbox, a website, a web page, a frame, a clickable link, a message, a post, or an input field. In particular embodiments, an object 410 may be consumed by a user if the user is able to, for example and without limitation, interact with, view, read, listen to, manipulate, or handle the object 410. For example, some user-consumable objects 410 may be texts, images, videos, audios, feeds, executables (e.g., application programs or games), websites, web pages, digital books, photo albums, posts, or messages.

In particular embodiments, when the user interface corresponding to object hierarchy 400 is displayed (e.g., on a client system 130), the structure of the corresponding object hierarchy 400 may reflect the structure of the user interface. The relationships among the individual components in the user interface, as reflected in object hierarchy 400, may influence how these components are organized and presented to users. The user interface may have any number of layers, respectively corresponding to the individual levels of object hierarchy 400. Objects 410 (e.g., user-interface components) at a specific level of object hierarchy 400 are displayed in the corresponding layer of the user interface. With some implementations, the lowest or bottommost layer of the user interface corresponds to the first or topmost level of object hierarchy 400. Thus, root object 410A is displayed in the lowest layer of the user interface. Furthermore, in the user interface, each object 410 (e.g., user-interface component) is displayed in a layer immediately above the layer where its parent, if one exists, is displayed and immediately below the layer where its children, if any, are displayed. Sibling objects 410 are displayed at the same layer. Thus, the position of a component in the user interface indicates its relationships (e.g., parent-child or sibling) with other components in the user interface.

In particular embodiments, a user-interface component (e.g., an image, a video, a folder, etc.) may be displayed in various display modes. As an example, the user-interface component may be displayed in a "full-screen" mode, where the user-interface component occupies the entire or nearly the entire display area (e.g., the screen of an electronic device). As another example, the user-interface component may be displayed in an "on-page" mode, where the user-interface component is included in another user-interface component and displayed as a part of that other user-interface component (e.g., an image is displayed as a part of a web page). As a third example, the user-interface component may be displayed in an "index" mode, where the user-interface component is a part of a series of user-interface components (e.g., an image is displayed together with other images from the same album, or a chapter of a book is displayed in the table of content of the book together with other chapters from the same book).

In particular embodiments, a hierarchical user interface may be used to present content to a user. Such a user interface may be referred to as a "content feed" or "news feed" user interface. The content may be of any type and format, such as, for example and without limitation, text, icon, image, video, audio, web page, post, or message. This disclosure contemplates any applicable content type and format. In particular embodiments, the individual content items (e.g., text, image, video, audio, web page, post, message, news piece, etc.) may be organized into various categories, referred to as content sections. For example, related content items may be categorized into the same content section. The user interface may include any number of content sections, and each content section may include any number of content items. Hierarchically, a content section may be the parent of the content items belonging to that section. For example, various photos taken during a holiday trip may be organized into the same album, and various photo albums may be organized into the photo section of the user interface.

In particular embodiments, a user may consume or interact with a specific content item. For example, a user consumes a content item when the user scrolls, opens up, views, listens to, selects, reviews, or comments on the content item. A user interacts with a content item when the user selects, clicks on, taps, reviews, or comments on the content item. This disclosure contemplates any applicable means for a user to consume or interact with a content item.

In particular embodiments, specific content items may be grouped together (e.g., based on their similarities or relationships). For example, a number of content items may be grouped together into a content section, in which case the content section is the parent of the content items belonging to it. A number of images (e.g. photos) may be grouped into a photo album, in which case the photo album is the parent of the photos belonging to it.

Figure 5A:
FIG. 5A illustrates a set of images stacked in a pile.

In particular embodiments, a photo album, and more specifically the photos in a photo album, may be presented to a user for viewing. In FIG. 5A, an example photo album 510 is displayed on the screen of a mobile device (e.g., a Smartphone). Here, photo album 510 is further included in another content item 520 (e.g., a post made by a user) so that photo album 510 is the child of user post 520.

In this example, photo album 510 has a title 531 (i.e., "Sea Ranch"), and there are five photos 532 included in photo album 510. Photo album 510 is thus the parent of the five photos belonging to it.

At this point, instead of displaying all the photos in photo album 510, the photos are stacked in a pile. Only one photo 511 on the top of the pile is completely shown. The rest of the photos are stacked below top photo 511. However, there is a visual indication 540 (e.g., strips of the photos stacked and layered), indicating that at this point, there are multiple photos stacked in a pile. Title 531 and number of photos 532 of photo album 510 are displayed on top of top photo 511.

Figure 5B:
FIG. 5B illustrates a single image.

In contrast, in FIG. 5B, a single photo 550 is displayed on the screen of the mobile device. Photo 550 is also included in a user post 560. However, in this case, there is no visual indication that there are multiple photos stacked in a pile or that there are more photos stacked below photo 550.

Visual indication 540 informs a user that there are multiple photos stacked in a pile and the user may expand the pile to view the individual photos, if he so chooses. In particular embodiments, the user may cause the pile of photos to expand with a specific user input. For example, if the screen of the mobile device is touch sensitive, the user may cause the pile of photos to expand with a specific gesture, such as pinch open or double tap.

Figure 6A:
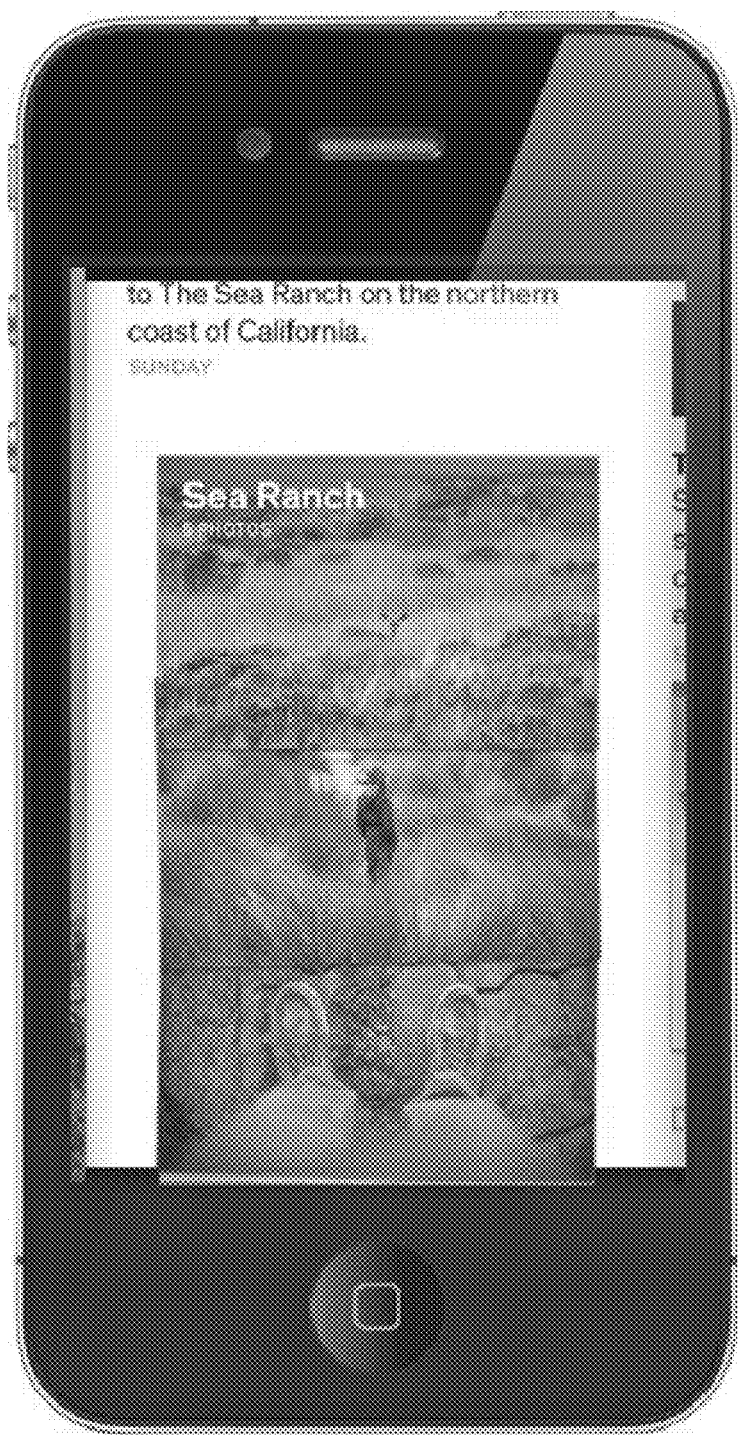
FIGS. 6A-6B illustrate expanding a pile of images to display the images sequentially in a series.
Figure 6B:

Suppose that the user provides the necessary input to cause the pile of photos to expand. In FIG. 6A, the photos stacked in the pile begin to expand vertically in a column. In particular embodiments, a pile of photos may expand vertically or horizontally, depending on the orientation of the screen on which it is displayed. In this case, the screen of the mobile device has a vertical orientation; thus, the pile of photos expands vertically. In FIG. 6B, the pile of photos has completed expanded, and the photos are now displayed in a series (e.g., sequentially in the vertical direction).

Figure 7A:
FIGS. 7A-7B illustrate scrolling through a series of images.
Figure 7B:
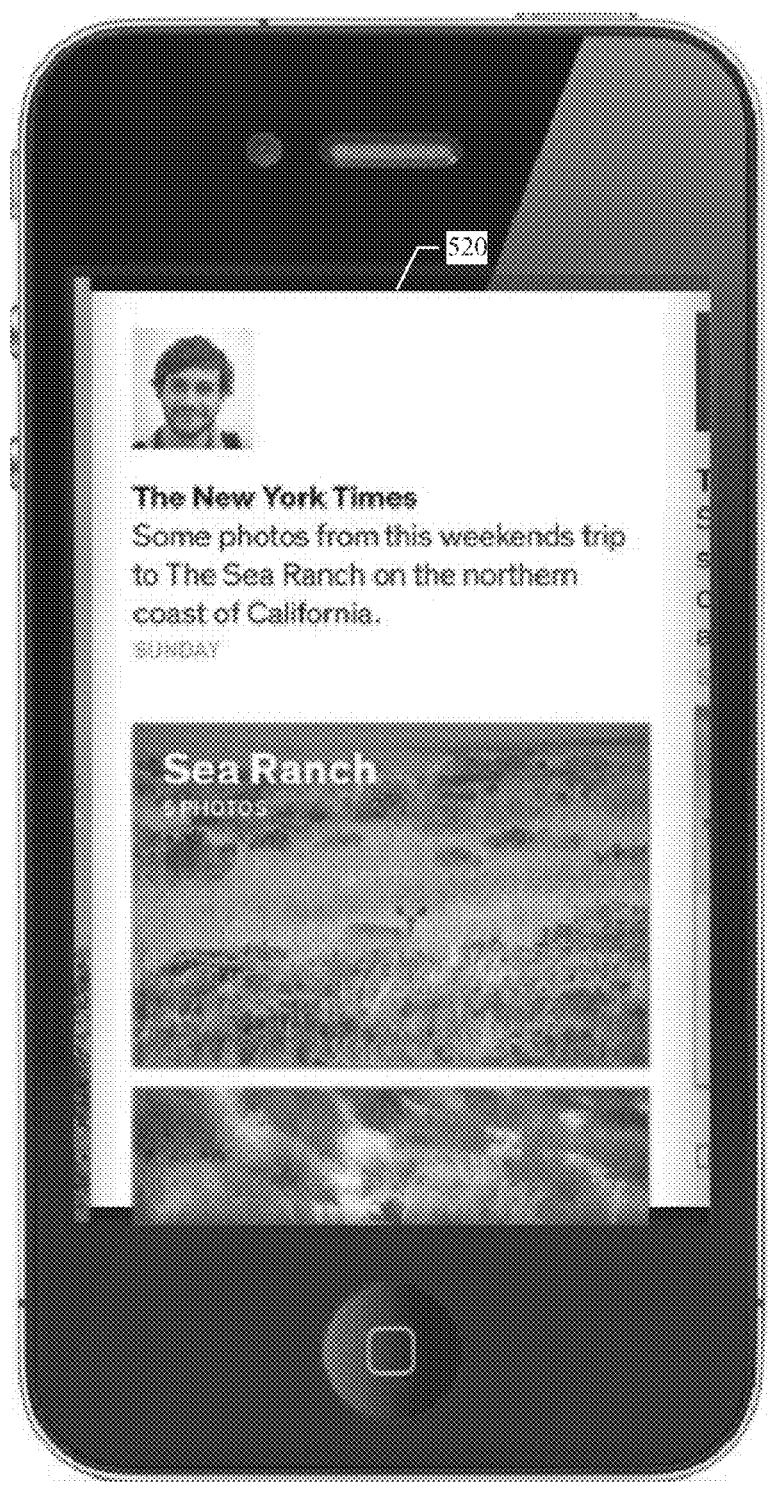

Due to the size limitation of the screen, not all the photos in a series can be displayed on the screen at the same time. In this case, although there are five photos in photo album 510, once expanded into a series, only two complete photos 511 and 512 and a portion of a third photo 513 can be displayed on the screen at one time. However, to view the individual photos, the user may scroll back and forth along the series of photos (e.g., by swiping a finger up or down across the touchscreen). For example, FIG. 7A illustrates that the user has scrolled toward the bottom of the series. FIG. 7B illustrates that the user has scrolled toward the top of the series.

Figure 8A:
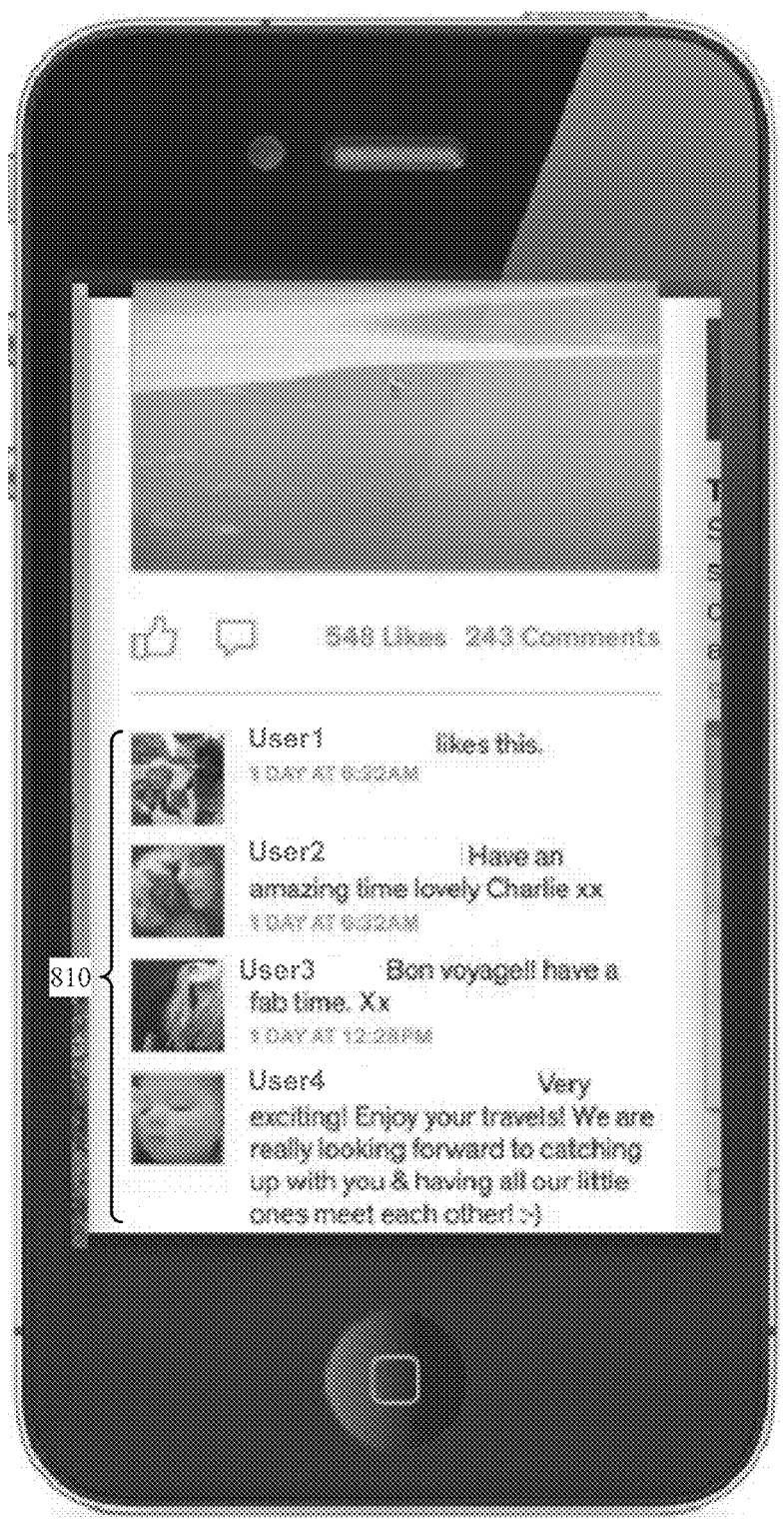
FIGS. 8A-8B illustrate scrolling through a series of user comments.
Figure 8B:

In particular embodiments, when the photos belonging to a photo album are displayed in the expanded form in a series, user comments concerning the photo album may also be displayed. For example, in FIG. 8A, several user comments 810 concerning photo album 510 are displayed below the last photo of the series. There may be many user comments 810 concerning photo album 510 such that not all of them can be displayed on the screen of the mobile device at one time. Thus, user comments 810 may also be displayed in a series (e.g., in this case, vertically) so that a user may scroll back and forth along user comments 810 to view the individual comments. For example, FIG. 8B illustrates that the user has scrolled toward the bottom of the available user comments 810 concerning photo album 510.

In particular embodiments, the user may also submit his own comment concerning photo album 510. For example, the user may click on link 820 to start the commenting process.

In particular embodiments, the user may cause an expanded series of photos to collapse back into a pile with another user input. For example, if the screen of the mobile device is touch sensitive, the user may cause a series of photos to collapse back into a pile with a specific gesture, such as pinch close or single tap. As another example, in FIG. 7B, the series of photos is included in user post 520. If, instead of explicitly collapsing the series of photos, the user moves onto another content item (e.g., another user post), leaving user post 520, which includes the series of photos, the series of photos is collapsed back into a pile automatically. When the user returns to user post 520, the photos are displayed in a collapsed pile, as illustrated in FIG. 5A, instead of in the expanded series.

Figure 9:
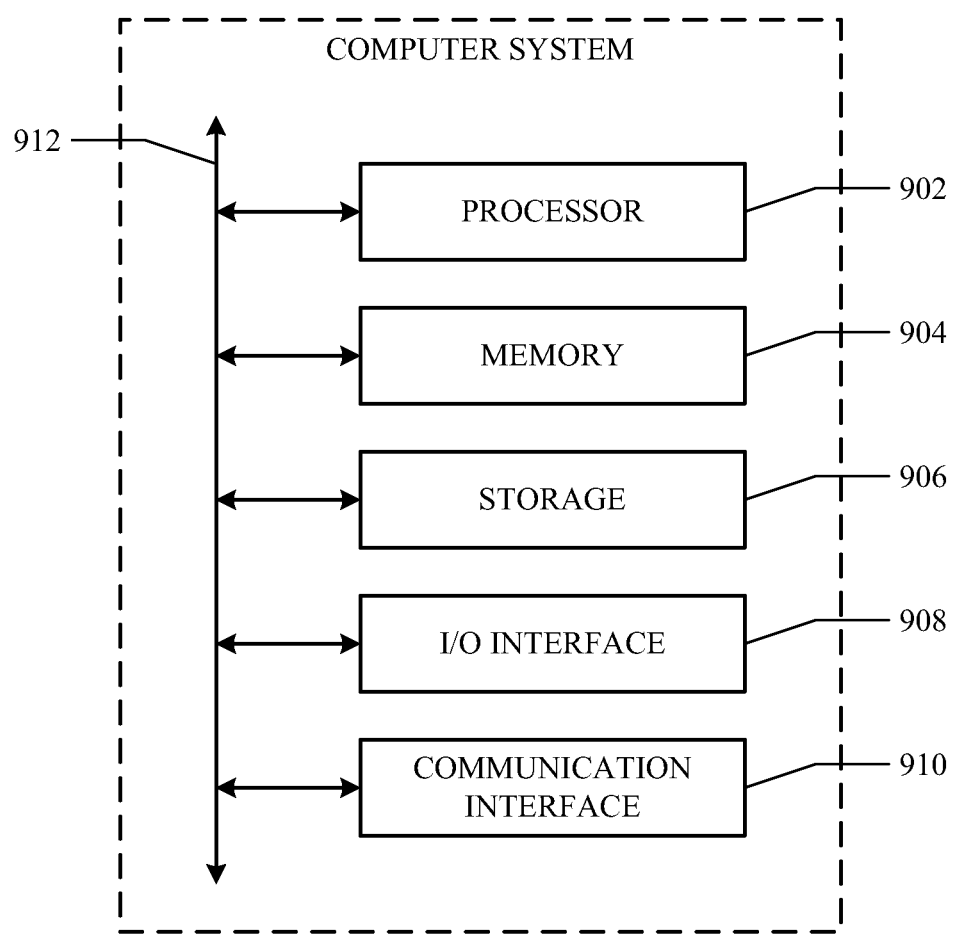
FIG. 9 illustrates an example computer system.

The image presentation operations described above may be implemented as computer software and executed on a computer system. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
    arranging a plurality of components of a user interface on a screen of an electronic device in a hierarchy, the hierarchy having one or more layers and each layer having at least one of the components of the user interface; and
    presenting the user interface according to a structure of the hierarchy, comprising:
        displaying a background component on a first layer of the user interface;
        displaying a pile of stacked images on a second layer of the user interface that overlays the first layer, wherein the pile visually indicates that there are multiple images stacked in the pile;
in response to a first user input to interact with the pile of stacked images,
determining a number of images to display based on a size of the screen and a predetermined size of each of a plurality of images, wherein the number of images is less than the plurality of images, and expanding the pile to display the number of images in a series, and
wherein, the number of images of the expanded images cover substantially an entirety of the screen and include at least one entirely displayed image and at least one image that is only partially displayed, the at least one partially displayed image being displayed by an edge of the screen such that a remainder of the partially displayed image is displayed in response to a second user input to scroll through the expanded images,
wherein scrolling through the plurality of images on the second layer of the user interface occurs independently from the background component on the first layer, and
wherein the displayed images are all displayed in a layout based on the orientation of the screen.

2. The method of claim 1, further comprising in response to a second user input in connection with the series, collapsing the series to display a first image of the plurality of images in the pile.

3. The method of claim 1, wherein displaying the images in a series comprises displaying the images sequentially in a vertical column.

4. The method of claim 1, wherein the images are a plurality of photos belonging to a photo album.

5. The method of claim 4, further comprising in response to the first user input in connection with the pile, displaying one or more user comments with respect to the photo album below the series of images.

6. One or more computer-readable non-transitory storage media embodying software that is operable when executed to:
arrange a plurality of components of a user interface on a screen of an electronic device in a hierarchy, the hierarchy having one or more layers and each layer having at least one of the components of the user interface; and
present the user interface according to a structure of the hierarchy, comprising:
display a background component on a first layer of the user interface;
display a pile of stacked images on a second layer of the user interface that overlays the first layer,
wherein the pile visually indicates that there are multiple images stacked in the pile;
in response to a first user input to interact with the pile of stacked images,
determine a number of images to display based on a size of the screen and a predetermined size of each of a plurality of images, wherein the number of images is less than the plurality of images, and
expand the pile to display the number of images in a series, and
wherein, the number of images of the expanded images cover substantially an entirety of the screen and include at least one entirely displayed image and at least one image that is only partially displayed, the at least one partially displayed image being displayed by an edge of the screen such that a remainder of the partially displayed image is displayed in response to a second user input to scroll through the expanded images,
wherein scroll through the plurality of images on the second layer of the user interface occurs independently from the background component on the first layer, and
wherein the displayed images are all displayed in a layout based on the orientation of the screen.

7. The media of claim 6, wherein the software is further operable when executed to in response to a second user input in connection with the series, collapse a series to display a first image of the plurality of images in the pile.

8. The media of claim 6, wherein display the images in a series comprises display the images sequentially in a vertical column.

9. The media of claim 6, wherein the images are a plurality of photos belonging to a photo album.

10. The media of claim 9, wherein the software is further operable when executed to in response to the first user input in connection with the pile, displaying one or more user comments with respect to the photo album below the series of images.

11. A system comprising:
one or more processors; and
a memory coupled to the processors comprising instructions executable by the processors, the processors operable when executing the instructions to:
arrange a plurality of components of a user interface on a screen of an electronic device in a hierarchy, the hierarchy having one or more layers and each layer having at least one of the components of the user interface; and
present the user interface according to a structure of the hierarchy, comprising:
display a background component on a first layer of the user interface;
display a pile of stacked images on a second layer of the user interface that overlays the first layer,
wherein the pile visually indicates that there are multiple images stacked in the pile;
in response to a first user input to interact with the pile of stacked images,
determine a number of images to display based on a size of the screen and a predetermined size of each of a plurality of images, wherein the number of images is less than the plurality of images, and
expand the pile to display the number of images in a series, and
wherein, the number of images of the expanded images cover substantially an entirety of the screen and include at least one entirely displayed image and at least one image that is only partially displayed, the at least one partially displayed image being displayed by an edge of the screen such that a remainder of the partially displayed image is displayed in response to a second user input to scroll through the expanded images,
wherein scrolling through the plurality of images on the second layer of the user interface occurs independently from the background component on the first layer, and
wherein the displayed images are all displayed in a layout based on the orientation of the screen.

12. The system of claim 11, wherein the processors are further operable when executing the instructions to in response to a second user input in connection with the series, collapse the series to display a first image of the plurality of images in the pile.

13. The system of claim 11, wherein display the images in a series comprises display the images sequentially in a vertical column.

14. The system of claim 11, wherein the images are a plurality of photos belonging to a photo album.

15. The system of claim 14, wherein the processors are further operable when executing the instructions to in response to the first user input in connection with the pile, displaying one or more user comments with respect to the photo album below the series of images.

* * * * *